March 6, 1928. 1,661,802
C. R. HITZ
FRUIT PRESS SUPPORT
Filed Dec. 24, 1926
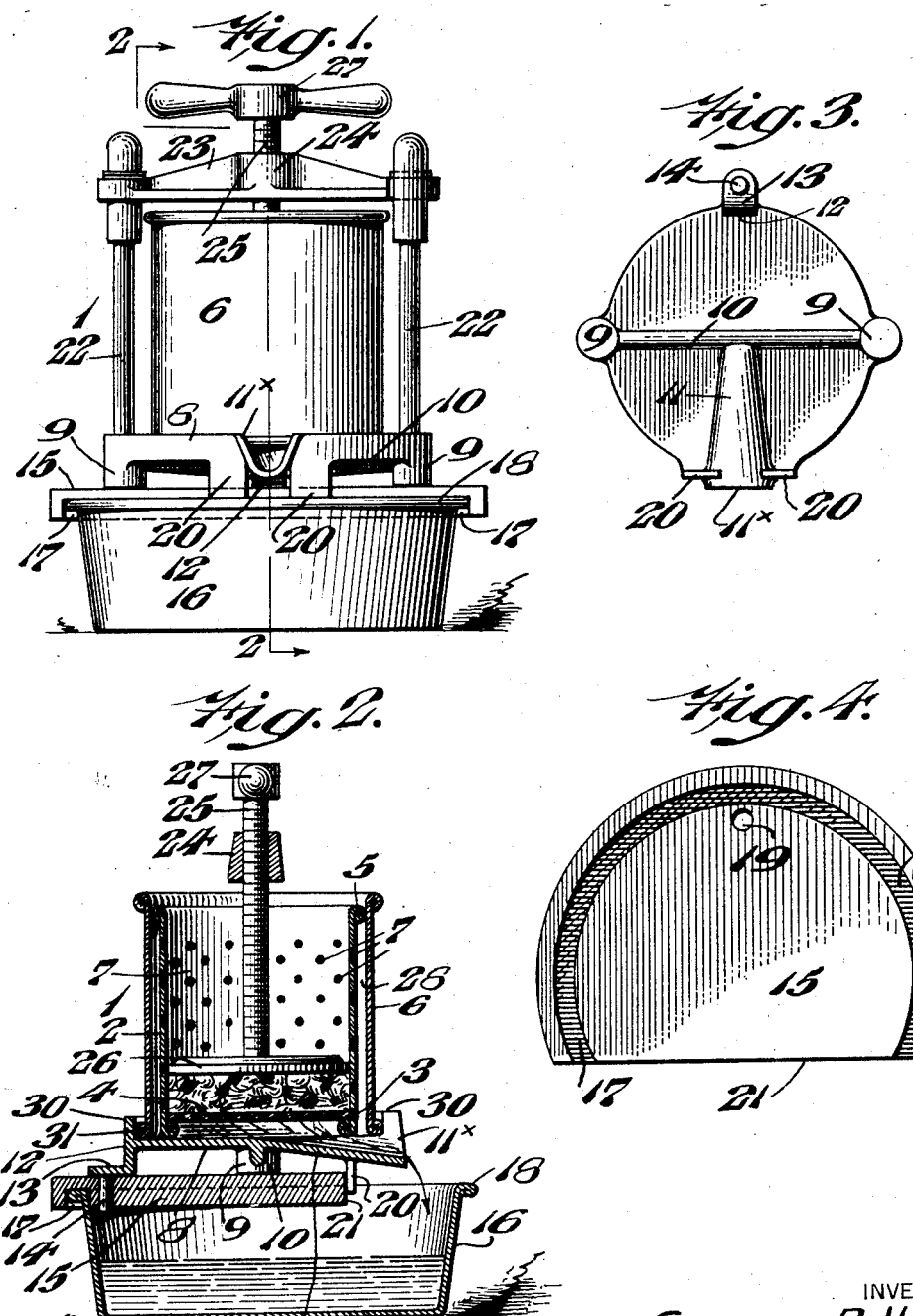
INVENTOR:
CHARLES R. HITZ,
BY
ATTORNEYS.

Patented Mar. 6, 1928.

1,661,802

UNITED STATES PATENT OFFICE.

CHARLES R. HITZ, OF PHILADELPHIA, PENNSYLVANIA, ASSIGNOR OF ONE-HALF TO HUGH G. DOAK, OF PHILADELPHIA, PENNSYLVANIA.

FRUIT-PRESS SUPPORT.

Application filed December 24, 1926. Serial No. 156,860.

My invention relates to a new and useful press and more particularly to a novel fruit press adapted for use in homes, restaurants and similar establishments, for expressing the juice from fruits, berries and the like.

My invention further relates to a novel portable or removable fruit press, which is adapted for use, in conjunction with any suitable receptacle such as a dishpan or the like, by being superimposed thereon, without the necessity of clamping or in any way fastening said press to the top of a table or similar support.

It has been the practice heretofore, generally to provide such presses with a clamp or other fastening means, whereby the same was tightly clamped or screwed onto the top of a table or the like. This practice frequently resulted in scratching or cracking the enamel with which kitchen and similar tables are ordinarily coated, or in marring the surface and finish of such tables. Another disadvantage lay in the fact that once the press was clamped or screwed onto the table top, it encumbered the table top and could not be conveniently removed at short notice, if so desired. Furthermore, devices of this character could not be conveniently used except in conjunction with a table having a top of a suitable thickness to fit the range of the clamping means provided in the particular type of press being used, and a pan to catch the juice generally was placed on the floor or in a chair and was liable to be accidentally tipped over or removed.

The object of my invention is to obviate these and other disadvantages by providing a fruit press which can be detachably mounted directly upon, and carried by a pan or receptacle of conventional size, said press and receptacle being movable from place to place at will, and occupying but little space.

Another object of my invention is to provide a fruit press of this character, which may be used in conjunction with my support and a standard size pan, thus eliminating the necessity for a table with a top of suitable thickness to be engaged by clamps or any other particular support, which has generally been found necessary with the devices of the prior art.

A still further object of my invention is to provide a sanitary fruit press and one which has a minimum number of parts, thus facilitating the thorough cleaning thereof and reducing the cost of manufacture and assembly considerably.

To the above ends, my invention consists of a receptacle, a cover plate therefor, detachably engaging the upper rim thereof and partially covering the same, an imperforate bottom plate detachably mounted on said cover plate, an inner perforated and an outer imperforate cylindrical shell, a perforated bottom plate within said inner shell, a yoke straddling said inner and outer shells, a threaded piston rod cooperating with said yoke to actuate the press plunger or piston within said inner shell, said shells, yoke, press rod and their adjuncts, being detachably assembled upon said bottom imperforate plate.

For the purpose of illustrating my invention, I have shown in the accompanying drawings, forms thereof which are at present preferred by me, since they will give in practice, satisfactory and reliable results, although it is to be understood that the various instrumentalities of which my invention consists can be variously arranged and organized and that my invention is not limited to the precise arrangement and organization of these instrumentalities as herein shown and described. In the accompanying drawings:—

Figure 1 represents a front elevation of a fruit press, embodying my invention.

Figure 2 represents a vertical section on line 2—2 of Fig. 1.

Figure 3 represents a bottom plan view of the imperforate bottom supporting plate, and Figure 4 represents a bottom plan view of the cover plate of my invention.

Referring to the drawings, in which like reference characters indicate like parts, 1 designates a fruit press embodying my invention, comprising an inner perforated, open ended, cylindrical shell 2, having its lower annular periphery turned or bent inwardly to form the annular bead 3, on which is detachably seated the perforated bottom or base member 4, said inner shell having its upper annular periphery turned or bent outwardly to form the bead which serves as an annular spacing member 5, to space said inner shell 2 from the outer imperforate cylindrical shell or casing 6, surrounding the same. The outer shell 6 serves to prevent the loss of juice as the same is squeezed out through the openings 7 in said shell 2. The inner and outer shells 2 and 6 respectively are detachably supported on the imperforate horizontal bottom plate 8 having the oppositely located legs 9, the diametrically extending reinforcing rib 10 which prevents the same from buckling under pressure, and the discharge nozzle 11. The rear leg 12 of the bottom plate 8 is provided with the horizontal flange 13, below which is the pendant pin or stud 14, seen in Figs. 2 and 3.

15 designates a cover plate of a circumference to fit a standard size receptacle, such as a dish pan 16, or the like, said cover plate being provided with the annular peripheral groove or recess 17, which seats upon the annular top rim 18 of said receptacle 16. 19 designates a hole in said plate 15, in which is seated the pin 14, in the horizontal flange 13 of the rear leg 12 of said bottom plate 8, thus detachably securing said bottom plate 8 to said cover plate 15, which in turn is detachably mounted on the receptacle 16, as will be understood from Fig. 2.

20 designates a pair of front pendant lugs projecting downwardly from said bottom member 8 and engaging the straight front edge 21 of said cover plate 15, thereby preventing any rotary movement or shifting of said bottom plate 8, or the press 1, with respect to the supporting receptacle 16, when the parts are assembled and the press is operated.

Straddling the inner and outer shells 2 and 6 respectively, and coacting in the conventional manner with the vertical members or posts 22, detachably supported on said bottom plate 8, is the yoke 23, having the central threaded boss 24, through which passes the threaded piston rod 25, to actuate the piston or plunger 26 within the inner shell 2, said piston rod being rotated by the handle 27.

As the piston 26 expresses the juice from the fruit or the like, the juice flows out through the perforated base member 4, and through the holes 7 in the inner cylindrical shell 2, and out through the annular passage 28 and collects in the trough 11 of the bottom plate 8, whence it flows through the spout 11ˣ into the front uncovered portion of the receptacle 16, as indicated by the arrow in Fig. 2.

In assembling my invention, I place the cover plate 15, on the receptacle 16, with the rim 18 thereof firmly engaged or seated in the groove 17 in said plate. I then assemble the press members proper, comprising the inner shell 2, the outer shell 6, the perforated base 4, the yoke 23 and its adjuncts, and the rod 25 and its adjuncts in position on said bottom plate 8, which is then seated on the cover plate 15, with the pendant pin 14 in the horizontal flange 13 of the rear leg 12 thereof, seated in the hole 19 in said cover plate and with the pendant lugs 20 on the front of said bottom member 8, engaging the straight front edge 21 of said cover plate 15, as will be apparent from Figs. 1 and 2.

Thus assembled, my novel fruit press can be moved about as a unit, and can be used on any suitable support, without clamping or screwing the same onto a table top or the like.

It is to be understood that the annular wall 30 of the bottom member 8, serves not only to permit the collection of the juice extracted while the same flows out through the spout 11ˣ, but also serves to retain said inner and outer shells 2 and 6 respectively and their adjuncts in assembled position thereon, since the diameter of said shells, particularly the outer shell 6, is such as snugly to seat within said annular wall 30, and frictionally to engage the same with the annular bead or flange 31 on the lower periphery thereof, as will be understood from Fig. 2.

The bottom plate member 8, the yoke 23 and its adjuncts, the inner and outer shells, as well as the piston rod and its adjuncts, are all separate and detachable, thus greatly facilitating the thorough cleaning and drying thereof, and resulting in a sanitary fruit press and preventing any rust or corrosion.

It will thus be seen that I have devised a novel fruit press which can be used in conjunction with receptacles of varying sizes, since it is merely necessary to have a plurality of cover plates 15 to fit receptacles of different diameters, as may be desired.

It will further be evident that, by minimizing the number of parts of my novel fruit press, the cost of manufacture, assembly and storage is considerably reduced and a more convenient and efficient press is produced.

Having thus described my invention, what I claim as new and desire to secure by Letters Patent is:—

1. In a fruit press, a bottom plate having a rear pendant pin and front pendant lugs and a trough positioned between said lugs, said pin and lugs being adapted to engage a plate supported on a receptacle.

2. The combination of a receptacle, a plate of less area than the top of said receptacle having a bottom peripheral groove in which the upper edge of said receptacle is seated, said plate having a hole in the rear thereof and a front edge and a fruit press having a bottom plate provided with a rear pendant pin seated in said hole.

3. The combination of a receptacle, a plate of less area than the top of said receptacle having a bottom peripheral groove in which the upper edge of said receptacle is seated, said plate having a hole in the rear thereof, a front edge, a fruit press having a bottom plate provided with a rear pendant pin seated in said hole and pendant lugs engaging said front edge, and a trough discharging into said receptacle.

CHARLES R. HITZ.